No. 872,550. PATENTED DEC. 3, 1907.
E. F. W. ALEXANDERSON.
INDUCTION MOTOR.
APPLICATION FILED NOV. 9, 1905.
3 SHEETS—SHEET 3.
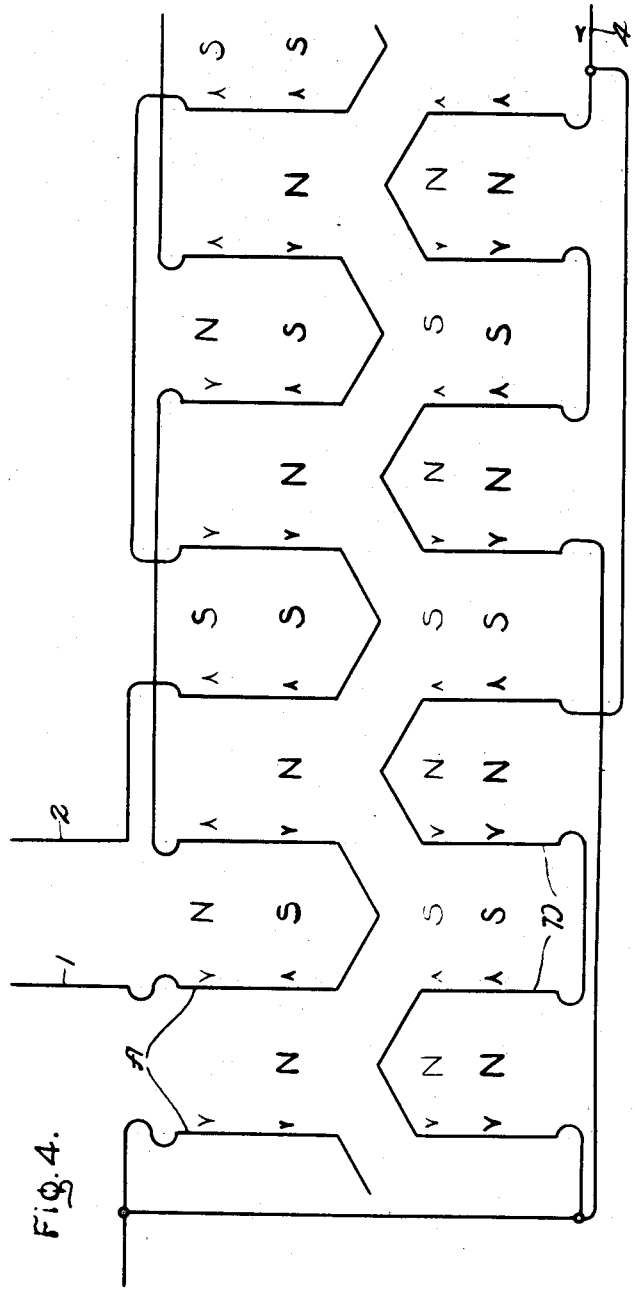
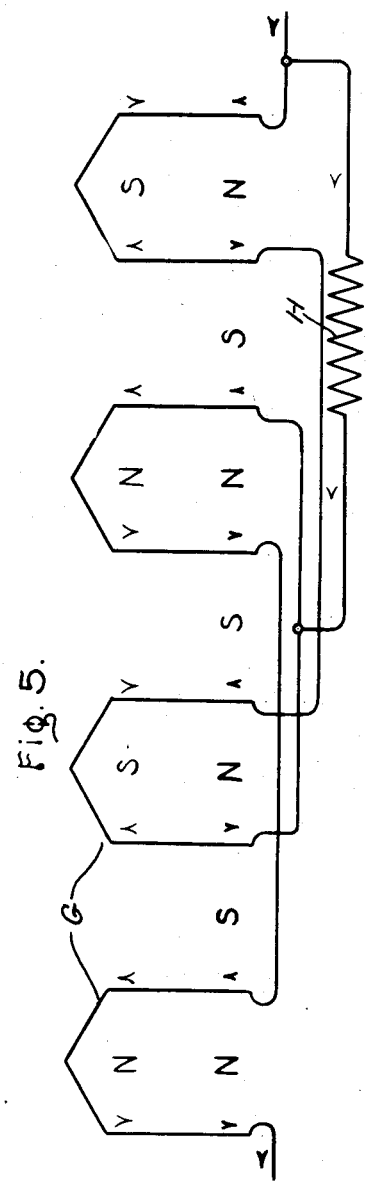
Witnesses:
George A. Thornton
Margaret E. Woolley
Inventor:
Ernst F. W. Alexanderson,
by Albert G. Davis
Atty.

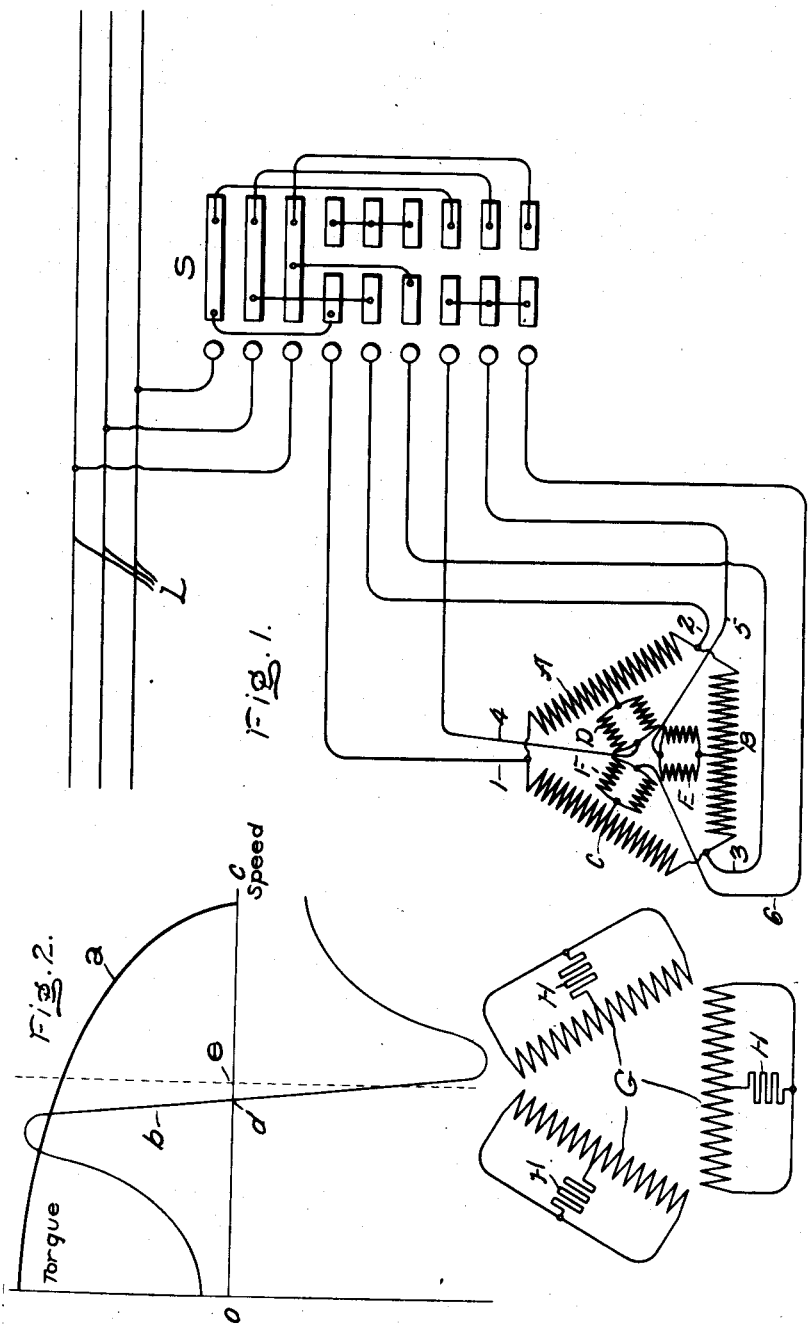

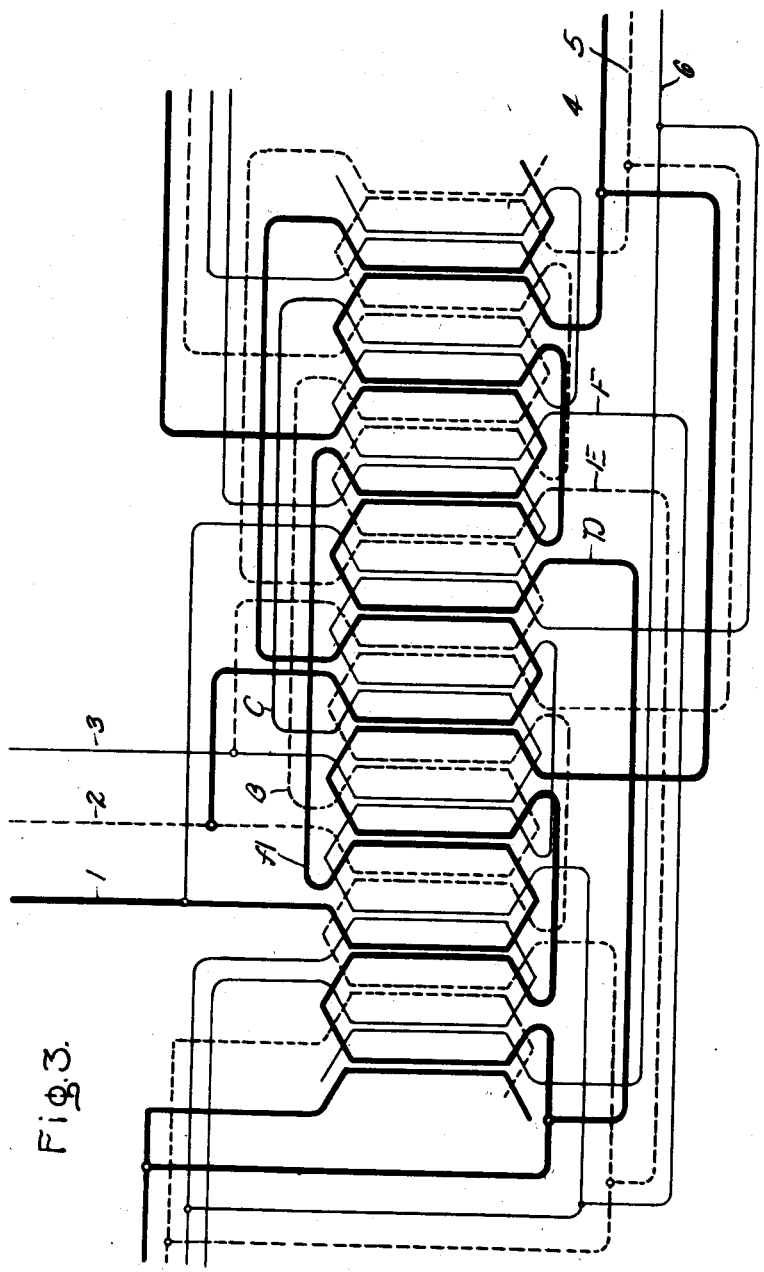

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-MOTOR.

No. 872,550.     Specification of Letters Patent.     Patented Dec. 3, 1907.

Application filed November 9, 1905. Serial No. 286,511.

*To all whom it may concern:*

Be it known that I, ERNST F. W. ALEXANDERSON, a subject of the King of Sweden, residing at Schenectady, county of Schenectady, State of New York, have invented certain new and useful Improvements in Induction-Motors, of which the following is a specification.

My invention relates to induction motors, and its object is to provide a novel arrangement and method of control of such motors whereby they are enabled to start with a high resistance in the rotor circuit and to operate when up to speed with maximum efficiency with the rotor short-circuited without requiring switching devices of any kind in the secondary circuit, and whereby certain advantages are secured which have not been obtained with arrangements used heretofore. A motor arranged in accordance with my invention may be controlled by a double-throw switch in the primary circuit of the motor, and is especially adapted for remote control.

It has been proposed heretofore to so arrange the rotor winding of an induction motor that it offers a low resistance path for currents induced by one number of poles in the primary and a high resistance path for currents induced by a different number of primary poles, and to so arrange the primary winding that it may be connected for either number of poles. With this arrangement when the primary winding is connected for a number of poles corresponding to the high resistance secondary path, the motor starts with resistance in the rotor circuit; then after the motor has started, by changing the connections of the primary winding so as to arrange it for the other number of poles, the motor runs as with a short-circuited secondary. With this arrangement, as heretofore employed, if the secondary is arranged to offer a low resistance path for the smaller number of poles, then obviously the motor must be started with the primary connected for the greater number of poles; and consequently unless the two numbers of poles are nearly equal,—an arrangement which ordinarily requires a special winding or complicated terminal connections, or both—the motor will run up, with resistance in the secondary circuit, to a speed which is only a fraction of the normal speed when connected for the smaller number of poles. Consequently, when the primary circuit connections are changed to establish the smaller number of poles, the motor must speed up with no resistance in the secondary circuit. The motor is thus likely to draw an excessive current and may exert a torque at first considerably less than its full-load torque. On the other hand, if the motor is arranged to offer a low resistance path for currents induced by the greater number of poles, then obviously the motor must be connected for the smaller number of poles at starting; and if this connection is maintained too long the motor will be brought up to a speed much higher than that at which it is intended to operate.

By my invention I so modify the connections of the primary winding that the motor may be started with the primary connected for a number of poles smaller than that at which the motor is designed to operate, so that it will be brought up to its normal speed with a resistance in the rotor circuit, but when it reaches approximately normal speed the torque characteristic of the motor will be such that it will be prevented from passing above this speed, no matter how long the controlling switch is maintained in starting position. I accomplish this result by so arranging the primary winding of the motor that when it is connected for starting it produces simultaneously two different numbers of poles. Owing to the difference between the torque characteristics of an induction motor having a short-circuited rotor and one having a high resistance in the rotor circuit, the portion of the primary winding connected to produce the greater number of poles, which is the number for which the secondary offers a low resistance path, exerts a practically negligible effect; so that the motor operates at starting substantially as though only the other portion of the winding were in circuit. As the motor approaches the speed which is synchronous for the greater number of poles, the torque due to the portion of the winding connected for the greater number of poles begins to exert a preponderating effect, and when this speed is passed this portion of the winding has a generator action which serves automatically to reduce the resultant motor torque and prevent the motor from reaching a speed above, or much above, the speed which is synchronous for the greater number of poles. The motor will consequently operate at this speed as long as the controlling switch is maintained in the starting position. Upon shifting the controlling switch to running position all the primary winding is connected for the greater number of poles and the motor then operates as an ordinary short-circuited induction motor. Since the motor is operating at substantially synchronous speed when this change is made, the speed of the motor is not varied, and consequently no excessive current is drawn from the source.

My invention then consists in the combination with an induction motor, of means for connecting the primary winding of the motor for producing simultaneously two different numbers of poles, the secondary of the motor being arranged to offer a low resistance path for the currents induced by one number of poles and a high resistance path for the currents induced by the other number of poles.

My invention further consists in connecting all of the primary winding for the number of poles corresponding to the low resistance secondary path when the motor is up to speed.

My invention further comprises certain specific arrangements and connections of the primary winding which render it possible to control the motor so as to obtain the above results with a simple double-throw switch, and with a minimum number of terminal connections.

My invention further comprises the method of starting an induction motor of the type described above, which consists in connecting the primary winding of the motor to produce two magnetizations of different pole numbers simultaneously.

My invention further comprises a method of operating an induction motor of the type described above, which consists in starting the motor by connecting the primary winding of the motor to produce two different numbers of poles simultaneously, and when the motor is up to speed connecting the primary winding to produce only the greater number of poles.

My invention will best be understood by reference to the accompanying drawings, in which Figure 1 shows diagrammatically the circuit connections of the motor and its controlling switch; Fig. 2 is an explanatory diagram of the motor torque characteristic; Fig. 3 shows a development on a plane surface of the primary winding; Fig. 4 shows a similar development of a single phase of the winding; and Fig. 5 shows a similar development of a portion of the secondary winding.

In connecting the primary winding of the motor I divide each phase into two groups,— thus, in Fig. 1, showing a three-phase motor, one phase is shown divided into the two groups A and D; a second phase into groups B and E; and the third into groups C and F. The corresponding groups A, B and C of the three phases are shown connected in delta, while each of the other groups has one terminal connected to a central point on the other group of the same phase. Thus, group D has one terminal connected to the central point of group A. Groups D, E and F are each arranged to produce the number of poles with which the motor is designed to operate under normal running conditions. The groups A, B and C are each arranged to produce the same number of poles as groups D, E and F, or a number equal to one-half of the poles produced by the other groups, according to the direction of current-flow in these groups. Thus, for instance, if group D is arranged to produce eight poles, group A is so arranged that when current flows through group D to the middle point of group A and then outward in both directions to the terminals of group A, group A will also produce eight poles; but if current is supplied to the terminals of group A, it will produce four poles.

The terminals 1, 2, 3, of the delta formed by groups A, B and C and the free terminals 4, 5, 6, of D, E and F are connected to a controlling switch S. This controlling switch is arranged to connect the source of three-phase current indicated by the line-wires L either to the terminals 1, 2 and 3 of the delta, or to the free terminals 4, 5 and 6 of groups D, E and F, and to short-circuit the set of terminals not connected to the source.

In order to clearly show the circuit connections I have shown the switch as of the drum type with its contacts developed on a plane surface. In practice a double-throw lever or knife switch might and preferably would be employed, and this switch may be provided with a spring to move it automatically from starting position when released, as described in Patent No. 735,077, Everest. The particular construction of controlling switch, however, forms no part of my present invention.

When the switch S is in its first or starting position three-phase current is supplied to the delta terminals 1, 2 and 3. This current flowing through groups A, B and C produces four poles in the motor. Current also flows through groups D, E and F, since their terminals 4, 5 and 6 are connected together so that these groups are in Y, and the current that flows through these groups produces eight poles in the primary member, which exist simultaneously with the four poles produced by groups A, B and C.

The rotor is provided with a number of groups G, each of which is so arranged that it offers a low resistance path for current induced by eight poles in the primary and a high resistance path for current induced by four poles in the primary,—that is, with the primary connected for eight poles, current flows directly through all the coils of each group G in series and through the short-circuit which connects the ends of each group, but with the primary connected for four poles current flows from both terminals of each group G to the central point of the group, then through resistance H and back to the terminals,—that is, the secondary offers a low resistance path for an eight-pole connection and a high resistance path for the four-pole position of the primary.

As has already been stated, the motor is so connected that at starting both a four-pole and an eight-pole magnetization exists in the primary member. The resultant effect is the same as though the torques of a four-pole and eight-pole motor were superposed; the four-pole motor being arranged with a high resistance in the rotor circuit and the eight-pole with a low resistance. The torque relations are shown in Fig. 2, which shows the speed torque characteristics for both the four-pole and the eight-pole portions of the primary winding. The curve $a$ represents the torque characteristic due to the four-pole portion of the primary winding. This curve has the well known characteristic of an induction motor having a high resistance in the secondary circuit; starting with a high torque which gradually diminishes becoming zero when synchronous speed is reached, the synchronous speed for the four-pole connection being indicated by the line $o\ c$. $b$ represents the torque characteristic due to the eight-pole portion of the primary winding at starting. This curve has the characteristic of an induction motor with short-circuited secondary. At starting the torque due to the eight-pole portion of the winding is practically negligible, as shown in the figure, but gradually increases as it approaches synchronism, falling abruptly again just before synchronism is reached. Synchronous speed for the eight-pole connection is indicated by the line $o\ d$. In passing above the synchronous speed the torque due to the eight-pole portion of the winding becomes negative,—that is, this portion of the winding has a generator action and the maximum generator torque is greater than the maximum motor torque. Obviously, this negative torque of the eight-pole portion of the winding tends to balance the torque due to the four-pole portion and at some point, as at $e$, the distance of the curve $b$ below the line, is equal to the distance of the curve $a$ above the line, of zero torque. That is, the resultant torque at this point is zero. Consequently, with a given load the motor will automatically cease accelerating at some speed below the point $e$; the particular speed depending upon the load on the motor. It will be noted that this speed is approximately synchronous speed for the eight-pole connection, so that if the portion of the winding which at starting was connected for four poles is now connected for eight poles, the speed of the motor will not be varied to any extent and the motor will operate as an ordinary eight-pole motor with a short-circuited secondary.

The connections of the motor windings for obtaining the relations which have been described above are shown in Figs. 3 to 5. Fig. 3 shows a development on a plane surface of the complete primary winding reduced to its simplest terms of one coil per pole per phase, one phase being indicated in heavy lines, another in dotted lines, and a third in light lines. In order further to simplify the diagram and to avoid confusion, the end connections and terminals of the four-pole portion of the winding are shown above the coils, and those for the eight-pole portion of the winding below the coils. The several terminals are numbered to correspond with Fig. 1. The arrangement of the primary winding will best be understood by referring to Fig. 4, which shows a single phase of the primary with the four-pole and eight-pole portions separated from each other. The direction of current in the windings at starting is indicated by light arrow-heads and the polarities produced by this current-flow are indicated by letters N and S in light lines. The current-flow with the running connection is indicated by heavy arrow-heads, and the polarities by letters in heavy lines. At starting the terminals 1 and 2 of the group A are connected to the source, as is shown in Fig. 1. The current at any instant may consequently be assumed as entering at terminal 1, passing through all the coils of group A in series, and out at terminal 2. This current-flow will produce four poles, as indicated by the letters N and S in light lines. At the same time a current will exist in the group D, which will be approximately ninety degrees out of phase with the current in group A, but the direction of which may be considered at any instant as indicated by the light arrow-heads with resultant polarities shown by the reference letters in light lines. This current produces eight poles, as shown, and since the relative direction of current-flow through the coils of group D is never changed in operation, this group always produces eight poles both at starting and in running. Thus, it will be seen that at starting two different numbers of poles co-exist in the primary winding,—four-pole magnetization due to the current in group A and an eight-pole magnetization due to the current in group D. Now if the free terminal 4 of group D is connected to the source, and the terminals 1 and 2 of groups A disconnected from the source and connected together by a short-circuit, current will flow through groups A and D, as indicated by the heavy arrows. It will be seen that this flow of current produces in group A an eight-pole magnetization which assists the magnetization produced by group D,—that is, all the coils of the phase are connected to produce an eight-pole magnetization.

Fig. 5 shows the arrangement of a portion of the rotor winding. This portion consists of a group of four coils which are connected in series in a closed circuit, with a resistance H connected between two points in its closed circuit in the manner indicated diagrammatically in Fig. 1. If this closed circuit is subjected to a four-pole magnetization, as indicated by the letters N and S in light lines, currents will be induced which will flow in the direction indicated by the light arrow-heads. It will be seen that these currents must flow through the resistance H, so the closed circuit acts as a high resistance secondary for the four-pole magnetization. If, however, this same circuit is subjected to an eight-pole magnetization, as indicated by the letters N and S in heavy lines, a current will be produced corresponding in direction to the heavy arrow-heads, and these currents flow around the closed circuit without passing through the resistance,—that is, the closed circuit acts as a short-circuit for the eight-pole magnetization. The rotor winding may be conveniently made up of a plurality of closed circuits similar to that shown in Fig. 5, distributed around the rotor core.

While I have shown a convenient arrangement of circuit connections for accomplishing the results desired, my invention is not limited in its broad aspects to these particular connections. Consequently I do not desire to limit myself to the construction and arrangement of parts here shown, but aim in the appended claims to cover all modifications which are within the scope of my invention.

What I claim as new and desire to secure by Letters Patent of the United States, is,—

1. In combination with an induction motor, means for connecting the primary winding of the motor for producing simultaneously different numbers of poles, the secondary of said motor being arranged to offer a low resistance path for currents induced by one number of poles and a high resistance path for currents induced by another number of poles.

2. In combination with an induction motor, means for connecting the primary winding of the motor for producing simultaneously two different numbers of poles, the secondary of said motor being arranged to offer a low resistance path for currents induced by one number of poles and a high resistance path for currents induced by the other number of poles.

3. In combination with an induction motor, means for connecting the primary winding of the motor for producing simultaneously two different numbers of poles, the secondary of said motor being arranged to offer a low resistance path for currents induced by the greater number of poles and a high resistance path for current induced by the smaller number of poles.

4. In combination with an induction motor, means for connecting two portions of the primary winding of the motor for producing simultaneously two different pole numbers bearing to each other the ratio of one to two, the rotor-winding being arranged to offer a low resistance path for currents induced by one number of poles and a high resistance path for currents induced by the other number of poles.

5. In combination with an induction motor, means for connecting two portions of the primary winding of the motor for producing simultaneously two different pole numbers bearing to each other the ratio of one to two, the rotor-winding being arranged to offer a low resistance path for currents induced by the greater number of poles and a high resistance path for currents induced by the smaller number of poles.

6. In combination with an induction motor having a secondary adapted to offer a high resistance path for currents induced by one number of poles and a low resistance path for currents induced by a second number of poles, means for connecting a portion of the primary winding of the motor for each number of poles at starting, and means for connecting all of the primary winding for said second number of poles when the motor has started.

7. In combination with an induction motor having a secondary adapted to offer a high resistance path for currents induced by one number of poles and a low resistance path for currents induced by a certain greater number of poles, means for connecting a portion of the primary winding of the motor for each number of poles at starting, and means for connecting all the primary winding for the greater number of poles when the motor has started.

8. In combination with an induction motor having a secondary adapted to offer a high resistance path for currents induced by one number of poles and a low resistance path for currents induced by double that number of poles, means for connecting a portion of the primary winding of the motor for each number of poles at starting, and means for connecting all the primary winding for the double number of poles when the motor has started.

9. In an induction motor, a primary member provided with a winding arranged to be connected to produce different numbers of poles simultaneously, and a secondary member having its winding connected to a short-circuiting connection and to a resistance in such a manner that it will offer a low resistance path for the currents induced by one number of poles and a high resistance path for currents induced by another number of poles.

10. In an induction motor, a primary member provided with a winding comprising two portions, one of said portions being arranged to produce a certain number of poles and the other portion being arranged to produce the same or a different number of poles according to its connection, and a secondary member having its winding connected to a short-circuiting connection and a resistance in such a manner that it will offer a low resistance path for currents induced by one number of poles and a high resistance path for currents induced by another number of poles.

11. In an induction motor, a primary member provided with a winding arranged to be connected to produce different numbers of poles simultaneously, and a secondary member having its winding connected to a short-circuiting connection and a resistance in such a manner that it will offer a low resistance path for currents induced by one number of poles and a high resistance path for currents induced by a smaller number of poles.

12. In an induction motor, a primary member provided with a winding comprising two portions, one of said portions being arranged to produce a certain number of poles and the other to produce the same or a smaller number of poles according to its connection, and a secondary member having its winding connected to a short-circuited connection and a resistance in such a manner that it offers a low resistance path for currents induced by the greater number of poles and a high resistance path for currents induced by the smaller number of poles.

13. In an induction motor, a primary winding having the coils of each phase divided into two groups, one of said groups having a terminal connected to an intermediate point on the other group, the latter group being connected to produce one number of poles when traversed by current flowing from one terminal to the other of said group and a second number of poles when traversed by current flowing from said intermediate point to both terminals.

14. In an induction motor, a primary winding having the coils of each phase divided into two groups, one of said groups having a terminal connected to an intermediate point on the other group, the latter group being connected to produce one number of poles when traversed by current flowing from one terminal to the other of said group and a second number of poles when traversed by current flowing from said intermediate point to both terminals, and the first-mentioned group being connected to produce said second number of poles.

15. In an induction motor, a primary winding comprising two portions, one of said portions being arranged to produce a certain number of poles, and the other portion being arranged to produce the same or a different number of poles according to its connection, and terminal leads for each of said portions.

16. In an induction motor, a primary winding having the coils of each phase divided into two groups, one of said groups being arranged to produce the same number of poles as the other group or a different number according to its connection to the source, and switch contacts for varying said connection.

17. In a three-phase induction motor, a primary winding having the coils of each phase divided into two groups, one group of each phase being connected with the corresponding groups of the other phases, and the second group of each phase having one terminal connected to the central point of the first group of each phase, and means for connecting either the free terminals of the first group or the free terminals of the second groups to the source.

18. In a three-phase induction motor, a primary winding having the coils of each phase divided into two groups, one group of each phase being connected with the corresponding groups of the other phases, and the second group of each phase having one terminal connected to the central point of the first group of each phase, means for connecting either the free terminals of the first group on the free terminals of the second groups to the source, and short-circuiting either set of terminals when not connected to the source.

19. The method of starting an induction motor having a secondary arranged to offer a low resistance path for currents induced by one number of primary poles and a high resistance path for currents induced by a lower number of poles, which consists in connecting the primary winding of the motor to produce both numbers of poles simultaneously.

20. The method of operating an induction motor having a secondary arranged to offer a low resistance path for currents induced by one number of primary poles and a high resistance path for currents induced by a lower number of poles, which consists in connecting the primary winding of the motor to produce both numbers of poles simultaneously at starting, and connecting said winding to produce only the greater number of poles when the motor is up to speed.

In witness whereof, I have hereunto set my hand this 8th day of November, 1905.

ERNST F. W. ALEXANDERSON.

Witnesses:
BENJAMIN B. HULL,
MARGARET E. WOOLLEY.